United States Patent [19]

Ogura

[11] Patent Number: 5,375,004
[45] Date of Patent: Dec. 20, 1994

[54] LIGHT CONNECTING DEVICE AND METHOD OF DRIVING THE SAME

[75] Inventor: Ichiro Ogura, Tokyo, Japan

[73] Assignee: NEC Corporation, Tokyo, Japan

[21] Appl. No.: 848,059

[22] Filed: Mar. 9, 1992

[30] Foreign Application Priority Data

Mar. 8, 1991 [JP] Japan ................................ 3-43144

[51] Int. Cl.$^5$ ................................ H04J 14/08
[52] U.S. Cl. .................... 359/139; 359/122; 359/156
[58] Field of Search ............... 359/109, 117, 122, 128, 359/139-140, 157, 156

[56] References Cited

U.S. PATENT DOCUMENTS 5,072,439  12/1991  Forrest et al. ............... 359/109
5,153,758  10/1992  Tashiro et al. ............... 359/124

OTHER PUBLICATIONS

Odagawa et al., "All Optical Flip-Flop of Bistable Laser Diode"; The Institute of Electronics, Information and Communication Engineers; Autumn National Convention Record, Part C-1, p. 48; 1988.

Ogura et al., "Optical Self-Routing Switch with Wavelength Filtering Function Using VSTEPS"; The Institute of the Applied Physics Engineers; 51st Convention, 1990.

"Double Heterostructure Optoelectronic Switch as a Dynamic Memory with Low-Power Consumption"; K. Kasahara et al.; Applied Physics Letter; vol. 52, pp. 679-681, Feb. 29, 1988.

Primary Examiner—Richard E. Chilcot, Jr.
Assistant Examiner—K. Negash
Attorney, Agent, or Firm—Leydig, Voit & Mayer

[57] ABSTRACT

A light connecting device for routing information uses only light signals. The light connecting device includes photoelectric input/output elements having a light threshold and a light memory, a polarized beam splitter, and light delay circuits having different light delays. The light input signal includes a timing signal and an information signal sequentially input into the beam splitter. The timing light signal is separated from the other signals using the beam splitter and then input into the respective photoelectric input/output elements through the light delay circuits. If the address light signal is incident in synchronization with that of the timing light signal, only the element on which the address and timing lights are simultaneously incident is turned ON and acts as a light amplifier by injecting current to amplify the information signals. Thus, the light connecting device of the invention realizes a self-routing operation using only light signals having the address of information specified by light signals.

6 Claims, 4 Drawing Sheets

LIGHT CONNECTING DEVICE AND METHOD OF DRIVING THE SAME

BACKGROUND OF THE INVENTION

The present invention relates to a light connecting device with an optical processing device.

In recent years, development of a computerized society has resulted in a demand for systems and devices such as an input/output device, a transmission device, a packet system, and a signal processing system having a greater capacity for processing information at higher speeds. To fulfill this demand, information is being processed using optics instead of electronics. At present, optical communications by optical fiber is widely used for transmitting information. However, the use of light may be limited to transportation of the information. Switching stations and packet systems are still controlled by conventional electronics circuits. Therefore, high speed optical processing is not realized due to a lower processing speed of the electronics circuits.

Although use of light for exchanging information provides high speed communication, such a system has not yet been proposed because optical devices are not only required to generate and receive light but also process threshold value and memory. For the optical device to respond to this demand, a photoelectric input/output element with a bi-stable laser and light thyristor has been developed. For an example of a bi-stable laser, see "Full Optical Type Flip-Flop Using Bi-Stable Laser", *Review of Articles*, Volume C-1, page 48, published at the national meeting of the Institute of Electronics, Information and Communication Engineers (IEICE) in Autumn 1988. A light exchange control may have a self-routing system where addresses and signals are loaded upon transmitting information. However, this system is not proposed in the bi-stable laser. This self-routing system requires accurate control of the wavelength of light.

An example of the light connecting element is described in detail in "Double Heterostructure Optoelectronic Switch As A Dynamic Memory With Low-Power Consumption", *Applied Physics Letters*, Volume 52, pages 679-681, 1988.

For an example of the light connecting element using the photoelectric input/output elements, see "Optical Self-Routing Switch With Wavelength Filtering Function Using VSTEPS", Institute of Applied Physics Engineers, Volume 3, page 754, 1990. The element construction, as shown in FIG. 1, performs a self-routing operation to determine the address of information by inputting light and electricity. Voltage pulses 51 and 52 in FIG. 1 are input into light input/output elements 61 and 62 in time series. In synchronization with the voltage pulses, address signal light 53 having address information is incident on the elements 61 and 62. The photoelectric input/output elements simultaneously receiving voltage pulses and an address signal light are selectively turned ON to operate. The elements turned ON receive a current equal to the laser oscillation threshold value or less and operate as a light amplifier. Thus, the received information signals 54 are amplified and then output.

However, since the self-routing device with the photoelectric input/output elements requires a synchronizing address signal light with an applied voltage, the self-routing device has problems, such as lower speed and a complicated structure resulting from circuits used for synchronizing the applied voltage.

SUMMARY OF THE INVENTION

An object of the present invention is to solve the problems and to propose a light connecting device capable of self-routing operation using only light.

A light connecting device in accordance with the invention includes a light routing device arranged with a plurality of photoelectric input/output elements having functions of light generation, threshold value, or memory and having at least two terminals as a driving terminal and a light input circuit for giving, respectively, in time series, a timing light signal for starting the connecting operation of the photoelectric input/output elements and information for transmitting the information to be connected.

The photoelectric input/output elements are formed by laminating semiconductor layers in p-type, n-type, p-type, and n-type order or n-type, p-type, n-type, and p-type order.

The light input circuit varies the emitting direction by polarization of incident light and provides a polarized beam splitter for polarizably separating the timing light signal from information for transmitting with the information to be connected.

The light input circuit delays the timing light signal polarized by the polarized beam splitter and provides a light delay circuit for causing a plurality of photoelectric input/output elements to be incident at a different timing.

A method of driving the light connecting device according to the invention comprises the steps of applying a voltage satisfying both of at least equal to a hold voltage and at least equal to a threshold voltage to the photoelectric input/output elements to be maintained in an ON state by light input and holding current injected into the photoelectric input/output elements at an oscillation threshold value or less in the ON state.

According to the invention, a plurality of photoelectric input/output elements with bases of optical thyristors are employed. The elements have functions of light generation, threshold processing, and memory. The elements can be turned ON by incident light with an intensity equal to at least the threshold value while voltage of the threshold level or less is applied across two terminals. If a current less than or equal to the laser oscillation threshold value is injected into the elements while the elements are turned ON, the elements operate as a light amplifier. In an OFF state of the elements, a light amplifier cannot be obtained without injecting the current even when applying a voltage.

When timing light signals with delayed timing are incident on the respective elements with shifted timing and address light signals are incident parallel to each other on the respective elements, then an element on which the delayed timing light signal and the address light signal are simultaneously incident is determined. If a sum of intensities of the timing light signal and the address light signal is an intensity of at least the threshold value, only the determined element is turned ON. Thereafter, an incident information signal is amplified and output only from the ON element. Thus, the invention provides a light connecting device capable of self-routing operation for controlling information addresses only by light signals.

PREFERRED EMBODIMENTS OF THE INVENTION

Figure 1:
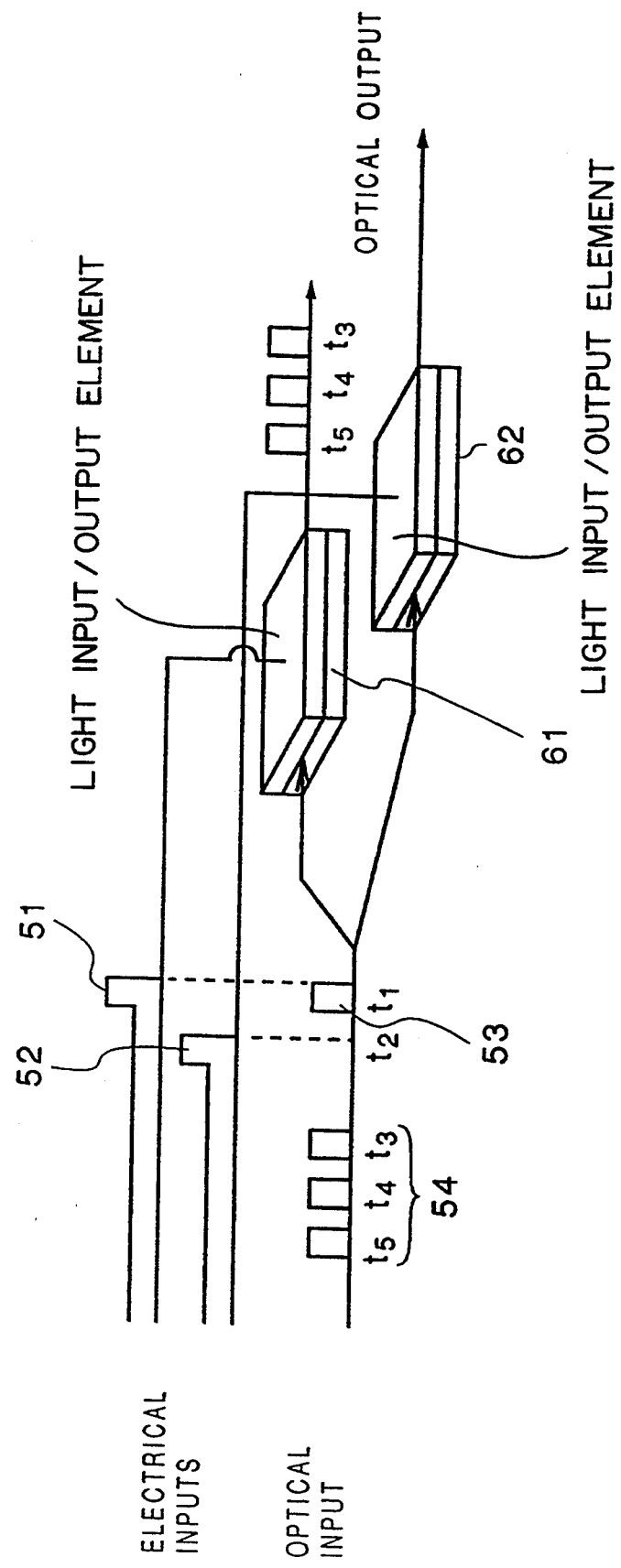
FIG. 1 is a view of the conventional system for self-routing operation using a photoelectric input/output element.
Figures 2, 2A:
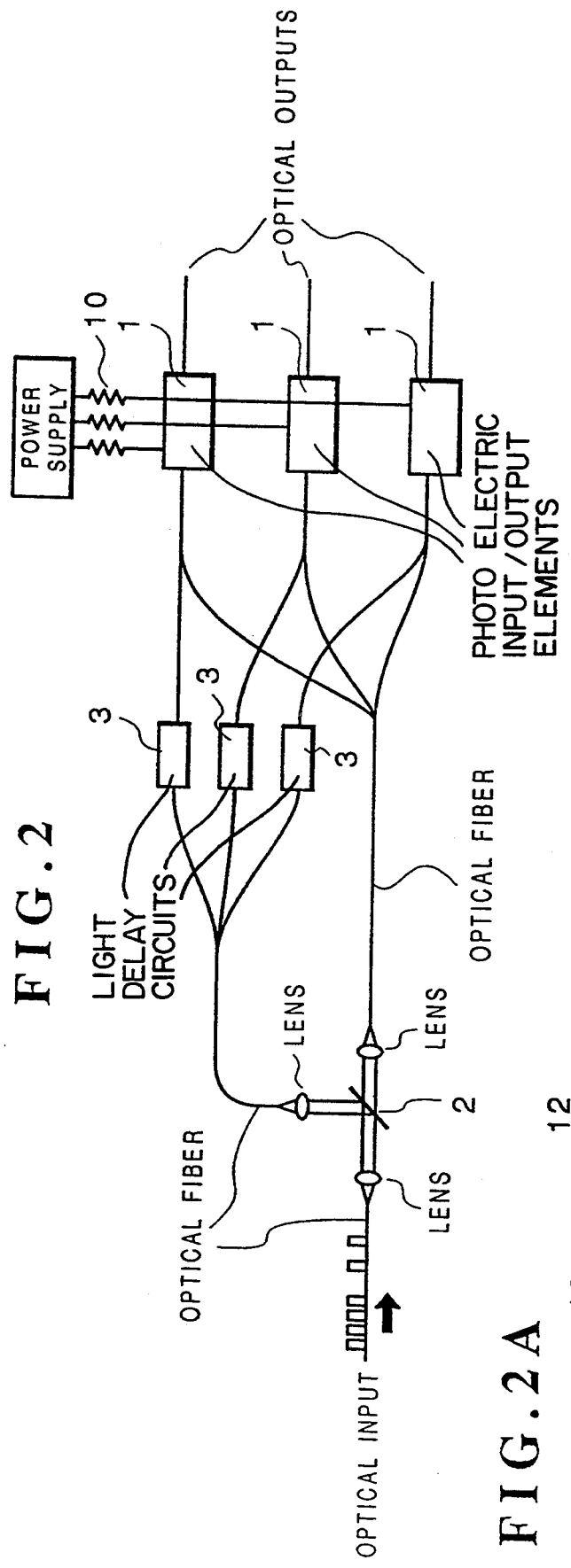
FIG. 2 is a view of an embodiment of a light connecting device according to the invention.
FIG. 2A is an enlarged diagram of the input signals of FIG. 2.

In FIG. 2, a light connecting device includes photoelectric input/output elements 1, a polarized beam splitter 2, and light delay circuits 3. The photoelectric input/output elements 1 are respectively connected through load resistors 10 to a power source. The photoelectric input/output elements receive a voltage equal to at least a threshold voltage.

Of light input signals, a timing light signal 11 has a different polarity from an address light signal 12 and information signals 13. An example of incident signals is shown in FIG. 2A, enlarged from FIG. 2. When lights having different polarities are incident on the polarized beam splitter 2, light having a polarity vertical to an optical axis plane of the beam splitter 2 is reflected in the vertical direction and light having a polarity horizontal to the optical axis plane is passed through the beam splitter 2 without changing direction. If, for example, a light source having a polarity in the vertical direction is selected for transverse magnetic (TM) mode light and a light source having a polarity in the horizontal direction is selected for transverse electric (TE) mode light, an ordinary semiconductor laser can be applied for the light source. In the illustrated embodiment, the timing light signal 11 has a polarity oriented in the vertical direction and the address light signal 12 and the information signals 13 have a polarity oriented in the horizontal direction. The timing light signal is polarized in the vertical direction by the polarized beam splitter 2 and is separated from the address light signal and the information signals.

The separated timing light signal is incident on the photoelectric input/output element 1 through the light delay circuit 3 and an optical fiber is applied, for example, for a light delay circuit 3.

The address signal and the information signals are evenly separated and are incident in parallel on the respective photoelectric input/output elements 1. A particular element 1 outputting information is defined by the timing light signal and the address light signal. The element 1 on which the timing light signal and the address light signal through the light delay circuit 3 are simultaneously incident is turned ON and amplifies the information signals to output.

The invention could propose a light connecting device capable of self-routing operating only by using light which was conventionally impossible to produce.

Figure 3:
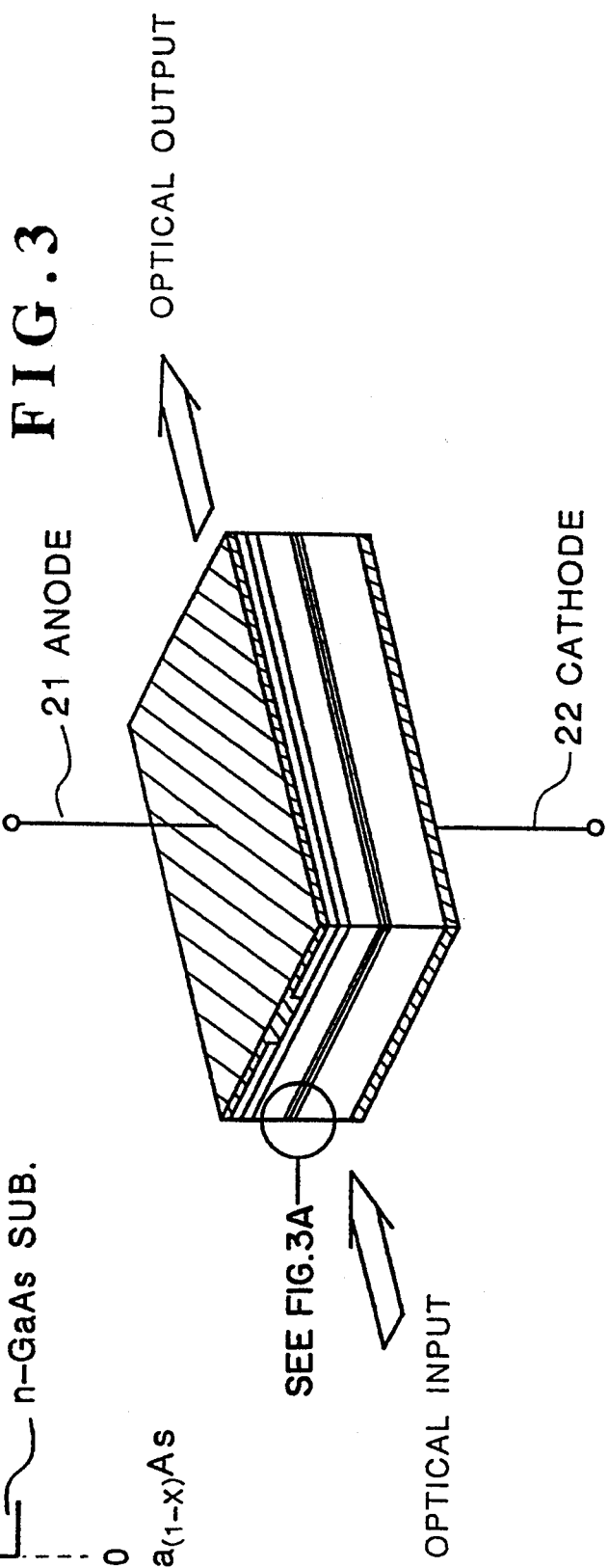
FIG. 3 is a view of an example of a photoelectric input/output element for use in the light connecting device of FIG. 2.
Figure 3A:
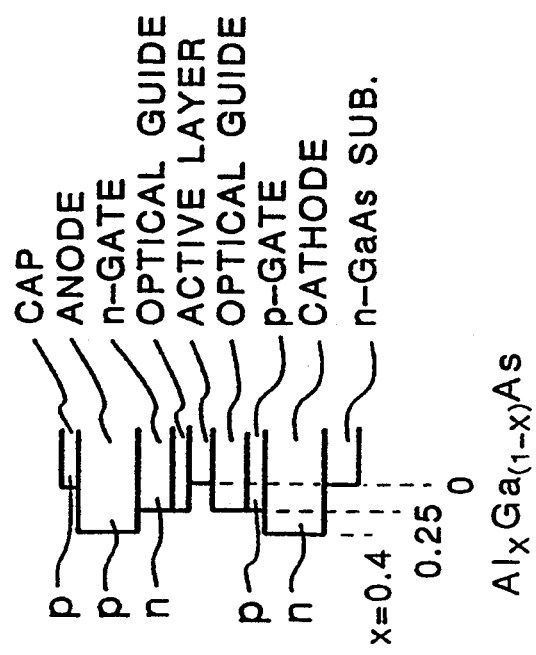
FIG. 3A is a fragmentarily enlarged view of a round marked portion of the element of FIG. 3.

In FIG. 3, the photoelectric input/output elements 1 include n-type and p-type layers of AlGaAs and GaAs, the details of which are shown in FIG. 3A. When the elements 1 receive incident light with an intensity equal to or greater than the threshold value while a voltage equal to or greater than the threshold value is applied across an anode 21 and a cathode 22, the elements 1 are switched from an OFF state to an ON state. In the ON state, the elements operate as amplifiers as long as an injecting current is less than or equal to the laser oscillation threshold value. The elements 1 exhibit a threshold voltage of 11.2 volts, a threshold light intensity of 8 pJ by energy conversion, and a laser oscillation threshold current of 120 mA and are turned OFF but short-circuiting both terminals.

Figure 4:
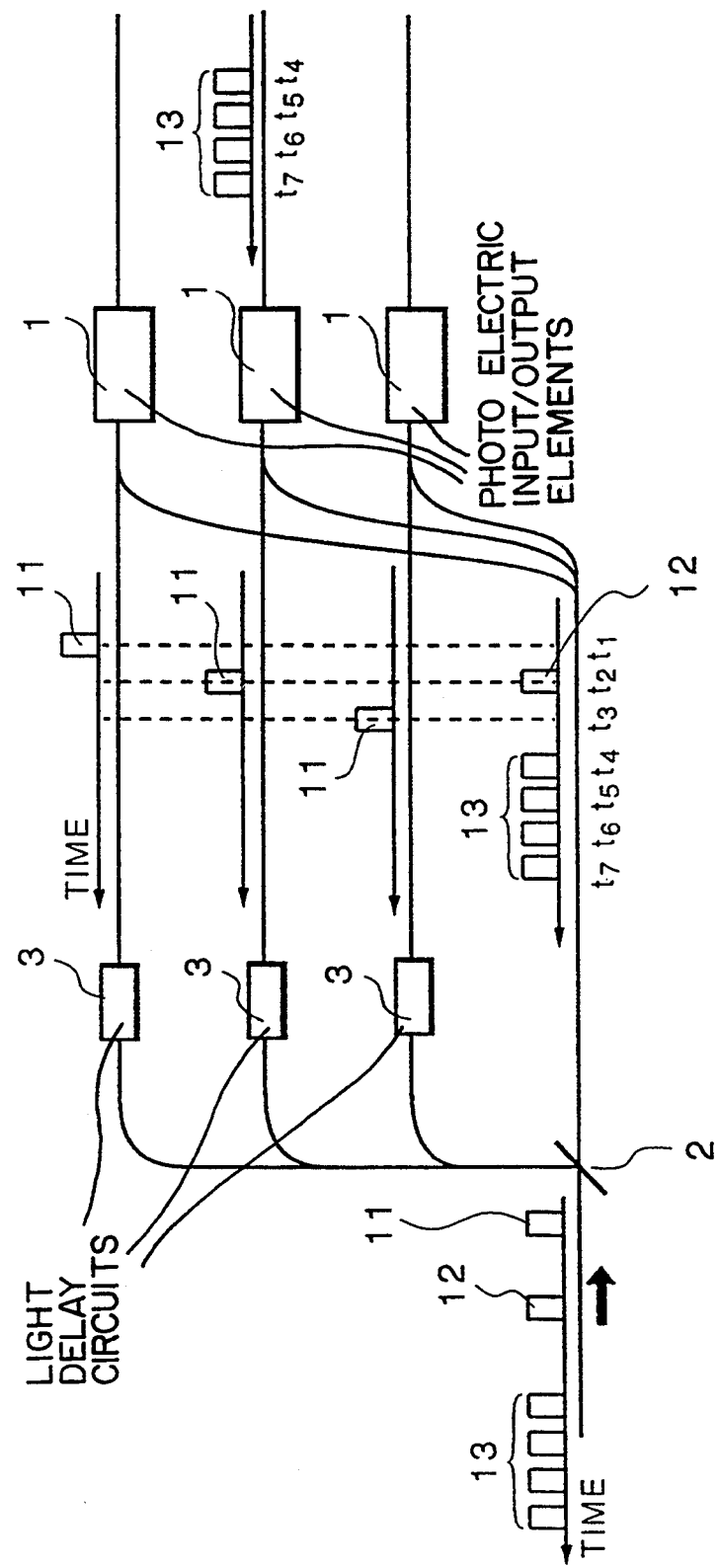
FIG. 4 is a view of an embodiment of a method of driving the light connecting device according to the invention.

In FIG. 4, a voltage less than or equal to a threshold voltage is applied to the photoelectric input/output elements 1. The timing light signal 11 is input into the light input circuit as a light input signal. The timing light signal 11 is reflected in the vertical direction by the polarized beam splitter 2 and evenly separated into the number of the photoelectric input/output elements to be delayed through the light delay circuits 3. The extent of delay is set, for example, by varying the length of an optical fiber. Thus, the timing light signals 11 input into the respective elements 1 can be optionally shifted at every timing base. More specifically, an optical fiber with a refraction rate of 1.5 may be delayed one nanosecond in every twenty centimeters. In this way, the timing light signals 11 are respectively incident on the first photoelectric input/output elements 1 at delay time $t_1$, the second element 1 at delay time $t_2$, and the third element 1 at delay time $t_3$.

The address light signal 12 passes through the polarized beam splitter 2 and is evenly separated into the number of photoelectric input/output elements 1 to be incident on the respective elements at the same time. Thus, by setting the incident timing of the address light signal 12 to the timings where the timing light signals 11 with delayed timing are incident on the respective photoelectric input/output elements 1, a predetermined one of the elements 1 can be turned ON. In this embodiment, an example is shown wherein the address light signal 12 is incident on the second element 1 at timing $t_2$ (simultaneous with the timing light signal 11) for obtaining an ON state of the second element 1.

A current injected into the photoelectric input/output elements 1 at an ON state can be optionally set if the load resistors 10 are connected in series with the elements 1. By injecting current of a laser oscillation threshold or less, the elements 1 are turned ON and act as light amplifiers to output the information signals 13.

As fully described above, the present invention proposes a light connecting device capable of self-routing operation which determines the address of information by light signal input.

I claim: resistors

1. A light connecting device comprising:
   a light input circuit having an input serially receiving first and second light signals, the light input circuit optically combining the first and second light signals; and
   a light routing device, coupled to the light input circuit, having a plurality of photoelectric input/output elements for light generation upon simultaneously receiving the first and second light signals from the light input circuit, wherein the first light signal has a first polarization and the second light signal has a second polarization different from the first polarization, and wherein the light input circuit includes a polarization beam splitter for outputting the first light signal having the first polarization on a first output and outputting the second light signal having the second polarization on a second output and including means for combining the first light signal from the first output and the second light signal from the second output.

2. The light connecting device as claimed in claim 1 wherein the light input circuit includes a plurality of delay circuits respectively coupled between the first output of the polarization beam splitter and the plurality of photoelectric input/output elements, wherein each of the plurality of delay circuits delays the first signal by a different amount for causing the first light signal to be received at each of the plurality of photoelectric input/output elements at a different time.

3. The light connecting device of claim 1 wherein the first light signal is a timing light signal and the second light signal is an address light signal.

4. A method for selectively routing light comprising:
polarizing a first light signal with a first polarization;
polarizing second light signals with a second polarization different from the first polarization;
transmitting the first light signal and the second light signals serially through a first optical medium;
receiving the light transmitted through the first optical medium and separating the first light signal and the second light signals using a polarized beam splitter; and
routing each of the second light signals respectively into a plurality of optical outputs by selectively combining the first light signal with at least one of the second light signals.

5. The method for selectively routing light as claimed in claim 4 wherein the step of routing each of the second light signals includes the step of delaying the first light signal relative to the second light signals.

6. The method for selectively routing light as claimed in claim 4 wherein the second light signals include a plurality of information light signals and wherein the first light signal is a timing light signal.

* * * * *